(12) United States Patent
Chiba et al.

(10) Patent No.: US 10,606,881 B2
(45) Date of Patent: Mar. 31, 2020

(54) SHARING CONTAINER IMAGES BETWEEN MULITPLE HOSTS THROUGH CONTAINER ORCHESTRATION

(71) Applicant: INTERNATIONAL BUSINESS MACHINES CORPORATION, Armonk, NY (US)

(72) Inventors: Tatsuhiro Chiba, Tokyo (JP); Hitomi Takahashi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/808,492

(22) Filed: Nov. 9, 2017

(65) Prior Publication Data
US 2018/0276215 A1 Sep. 27, 2018

Related U.S. Application Data

(63) Continuation of application No. 15/465,062, filed on Mar. 21, 2017.

(51) Int. Cl.
*G06F 16/00* (2019.01)
*G06F 16/51* (2019.01)
*H04L 29/08* (2006.01)
*G06F 8/60* (2018.01)

(52) U.S. Cl.
CPC .......... *G06F 16/51* (2019.01); *H04L 67/1095* (2013.01); *H04L 67/1097* (2013.01);
(Continued)

(58) Field of Classification Search
CPC ............... G06F 3/067; G06F 17/30575; G06F 11/1448; G06F 11/1451; G06F 11/1461;
(Continued)

(56) References Cited

U.S. PATENT DOCUMENTS 7,657,887 B2 * 2/2010 Kothandaraman ..... H04L 67/06
717/170
7,720,815 B1 * 5/2010 Jagannathan ....... G06F 11/1658
707/640

(Continued)

FOREIGN PATENT DOCUMENTS

WO WO2016115371 7/2016

OTHER PUBLICATIONS

List of IBM Patents or Patent Applications Treated as Related dated Nov. 9, 2017, 2 pages.

*Primary Examiner* — Michelle N Owyang
(74) *Attorney, Agent, or Firm* — Tutunjian & Bitetto, P.C.; Vazken Alexanian

(57) ABSTRACT

A computer-implemented method is provided for container sharing and scheduling in an environment having a plurality of nodes. The method includes deploying a container management service system that manages a list of layered images. The list specifies one or more container attributes for each layered image stored at the nodes. The method includes selecting, by a processor-based scheduler of the container management system based on the list of layered images, a given one of the nodes which (i) includes image layers residing in a container and (ii) communicates with one or more candidate nodes that include one or more missing image layers. The candidate nodes are determined from among the nodes based on one or more availability criterion. The method includes pulling the one or more missing image layers from the candidate nodes and copying the one or more missing image layers to the given one of the nodes.

15 Claims, 11 Drawing Sheets

(52) U.S. Cl.
CPC .......... *H04L 67/16* (2013.01); *H04L 67/2838* (2013.01); *G06F 8/60* (2013.01); *H04L 67/2852* (2013.01)

(58) Field of Classification Search
CPC ......... G06F 17/30082; G06F 17/30088; G06F 2009/4557; G06F 2201/84; G06F 17/30265; G06F 17/30194; G06F 17/3028; G06F 17/30581; G06F 16/51
USPC .................................................. 707/600–899
See application file for complete search history.

(56) References Cited

U.S. PATENT DOCUMENTS

| | | | |
|---|---|---|---|
| 9,684,561 B1 * | 6/2017 | Yan | G06F 16/27 |
| 2004/0181575 A1 * | 9/2004 | Mallberg | H04L 67/16 709/203 |
| 2015/0142878 A1 * | 5/2015 | Hebert | H04L 67/10 709/203 |
| 2016/0124665 A1 * | 5/2016 | Jain | G06F 3/0619 711/162 |
| 2016/0125059 A1 * | 5/2016 | Jain | G06F 3/0619 707/639 |
| 2016/0162320 A1 | 6/2016 | Singh et al. | |
| 2016/0182315 A1 | 6/2016 | Salokanto et al. | |
| 2017/0116074 A1 * | 4/2017 | Hayes | G06F 11/1076 |
| 2017/0177877 A1 * | 6/2017 | Suarez | G06F 17/30477 |
| 2017/0180346 A1 * | 6/2017 | Suarez | G06F 9/45558 |
| 2017/0220329 A1 * | 8/2017 | Yang | G06F 8/60 |
| 2018/0268115 A1 * | 9/2018 | Zhang | G06F 8/63 |
| 2018/0322675 A1 * | 11/2018 | Cao | G06T 11/60 |

\* cited by examiner

SHARING CONTAINER IMAGES BETWEEN MULITPLE HOSTS THROUGH CONTAINER ORCHESTRATION

BACKGROUND

Technical Field

The present invention relates generally to information processing and, in particular, to sharing multiple container images between multiple hosts through container orchestration.

Description of the Related Art

Container-based virtualization (e.g. Docker®) is widely used in Cloud and DevOps environments. There are many technologies in container-based virtualization (LXC, namespace, cgroups, UnionFS, and so forth), but UnionFS is one of important functionality that enables us to combine multiple read-only file system vertically. Each UnionFS layer has unique content hash ID (e.g., d31f33e . . . ), so it guarantees the image layer's immutability.

Container management systems (e.g. Kubernetes®, Docker® Swarm) are developed for managing container lifecycle (Create, Read, Update, and Delete (CRUD)) in a cluster-wide system. As a typical example, once a container creation request is received, a scheduler decides the host where requested containers will run, and then an agent in the host launches the container.

However, the container management systems are not without deficiency. For example, all hosts download "images" from a centralized container repository when launching a new container. Thus, fetching images independently from the repository even if these are same UnionFS layer, so that network bandwidth is consumed by the duplicated image download tasks. Moreover, the reliability of network reachability to the repository will be a single point of failure.

Further relating to deficiencies of such container management systems, the container scheduler does not consider the locality where these image layers are stored or not stored. The image layer is immutable and sharable, but the system does not manage it. Moreover, container images are deleted periodically if the host does not have enough space to keep the container images.

Thus, there is a need for a mechanism to share container images between multiple hosts.

SUMMARY

According to an aspect of the present invention, a computer-implemented method is provided for container sharing and scheduling in an environment having a plurality of nodes. The method includes deploying a container management service system that manages a list of layered images. The list of layered images specifies one or more container attributes for each of the layered images stored at the plurality of nodes. The method further includes selecting, by a processor-based scheduler of the container management system based on the list of layered images, a given one of the plurality of nodes which (i) includes image layers residing in a container and (ii) communicates with one or more candidate nodes that include one or more missing image layers. The one or more candidate nodes are determined from among the plurality of nodes based on one or more availability criterion. The method also includes pulling the one or more missing image layers from the one or more candidate nodes and copying the one or more missing image layers to the given one of the plurality of nodes.

According to another aspect of the present invention, a computer program product is provided for container sharing and scheduling in an environment having a plurality of nodes. The computer program product includes a non-transitory computer readable storage medium having program instructions embodied therewith. The program instructions are executable by a computer to cause the computer to perform a method. The method includes deploying a container management service system that manages a list of layered images. The list of layered images specifies one or more container attributes for each of the layered images stored at the plurality of nodes. The method further includes selecting, by a processor-based scheduler of the container management system based on the list of layered images, a given one of the plurality of nodes which (i) includes image layers residing in a container and (ii) communicates with one or more candidate nodes that include one or more missing image layers. The one or more candidate nodes are determined from among the plurality of nodes based on one or more availability criterion. The method also includes pulling the one or more missing image layers from the one or more candidate nodes and copying the one or more missing image layers to the given one of the plurality of nodes.

According to still another aspect of the present invention, a system is provided for container sharing and scheduling in an environment having a plurality of nodes. The system includes a container management service system. The container management service system is configured to manage a list of layered images. The list of layered images specifies one or more container attributes for each of the layered images stored at the plurality of nodes. The container management service system is further configured to select, based on the list of layered images, a given one of the plurality of nodes which (i) includes image layers residing in a container and (ii) communicates with one or more candidate nodes that include one or more missing image layers. The one or more candidate nodes are determined from among the plurality of nodes based on one or more availability criterion. The container management service system is also configured to allow pulling the one or more missing image layers from the one or more candidate nodes and copying the one or more missing image layers to the given one of the plurality of nodes.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to sharing multiple container images between multiple hosts through container orchestration.

The present invention has optimized container scheduling and has provided a sharing feature based on container lifecycle management in the cloud.

In an embodiment, the present invention provides a method/system for preparing a CLuster Membership (CLM) registry service in a container management system, a method/system for providing a container scheduling policy based on the CLM registry service, and a method/system for pulling cached image layers from nearby nodes to the scheduled node based on the scheduling policy. It is to be appreciated that the terms "host" and "node" are used interchangeably herein to refer to a hardware apparatus or hardware system involving, at the least, a processor, a memory, and a communication mechanism for interacting with other hosts/nodes.

Regarding the method/mechanism for preparing a CLM registry service, a list is maintained by the CLM registry service 331, where the list includes container attributes. The container attributes can include, but are not limited to, image layer id, images id owned by nodes, node distance, and so forth. The list is updated responsive to the launch of a new container or the performance of an image garbage collection cycle.

Regarding the method/mechanism for providing a container scheduling policy, the method/mechanism selects a node which has many (e.g., above a threshold) image layers in a given container, and selects a node with many candidate nodes nearby that have missing image layers.

Regarding the method/mechanism for pulling cached image layers, the method/mechanism asks a container management service to get the availability of candidate nodes (e.g., central processing unit (CPU), network, or distance). Based on the availability, the method/mechanism chooses a node to send a pull request to and copies the missing image to a local node.

Figure 1:
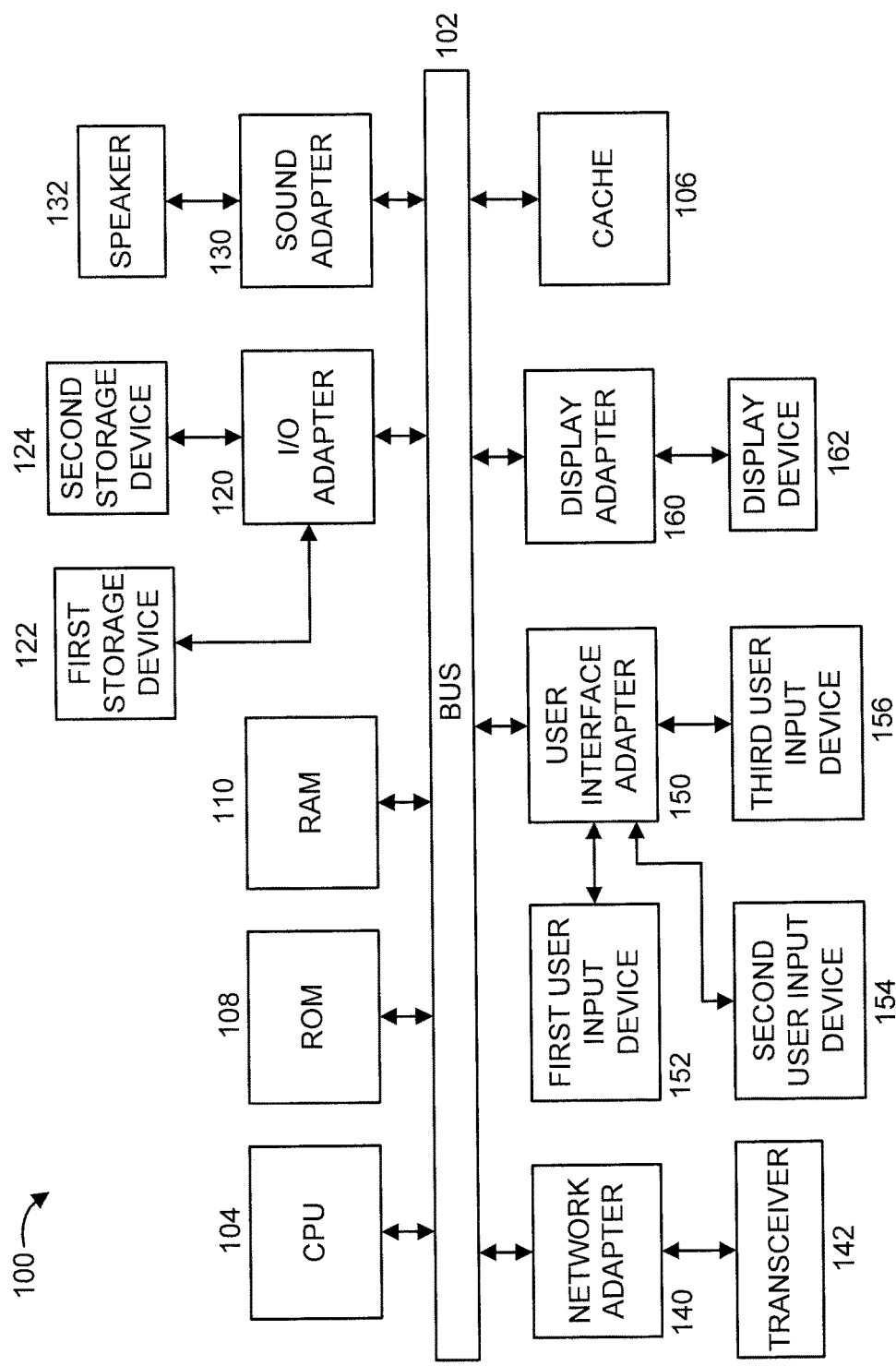
FIG. 1 shows an exemplary processing system to which the invention principles may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that environments 500, 700, 900, and 1000 described below with respect to FIGS. 5, 7, 9, and 10, respectively, are environments for implementing respective embodiments of the present invention. Part or all of processing system 100 may be implemented in one or more of the elements of environments 500, 700, 900, and 1000.

Figure 2:
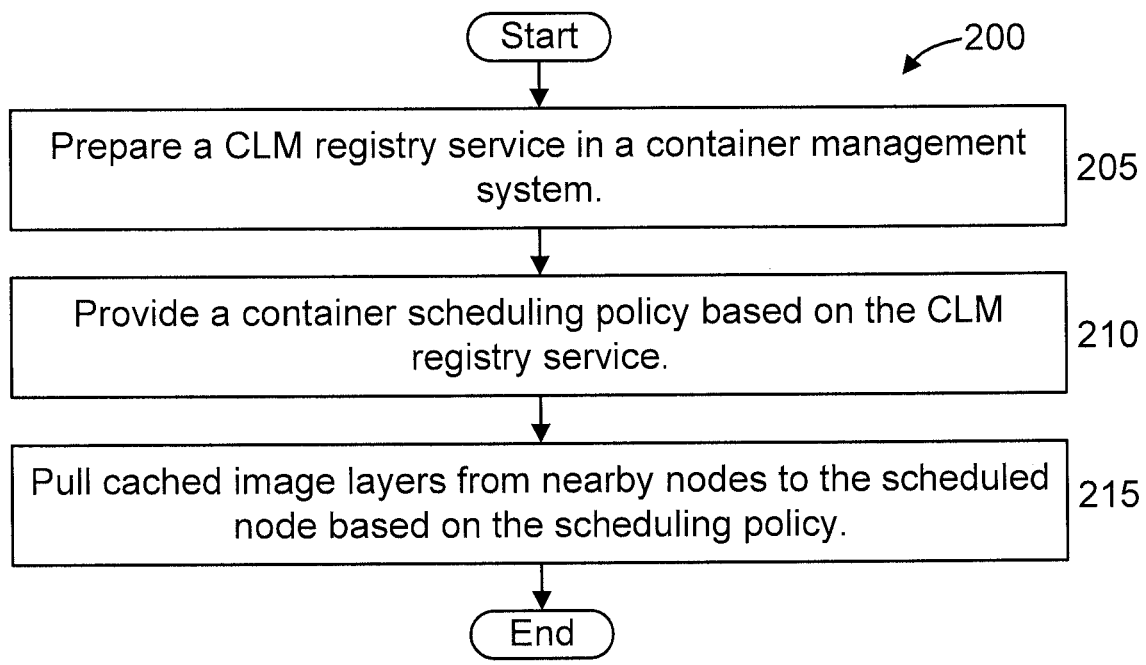
FIG. 2 shows an exemplary method for sharing container images between multiple hosts through container orchestration, in accordance with an embodiment of the present invention.
Figure 3:
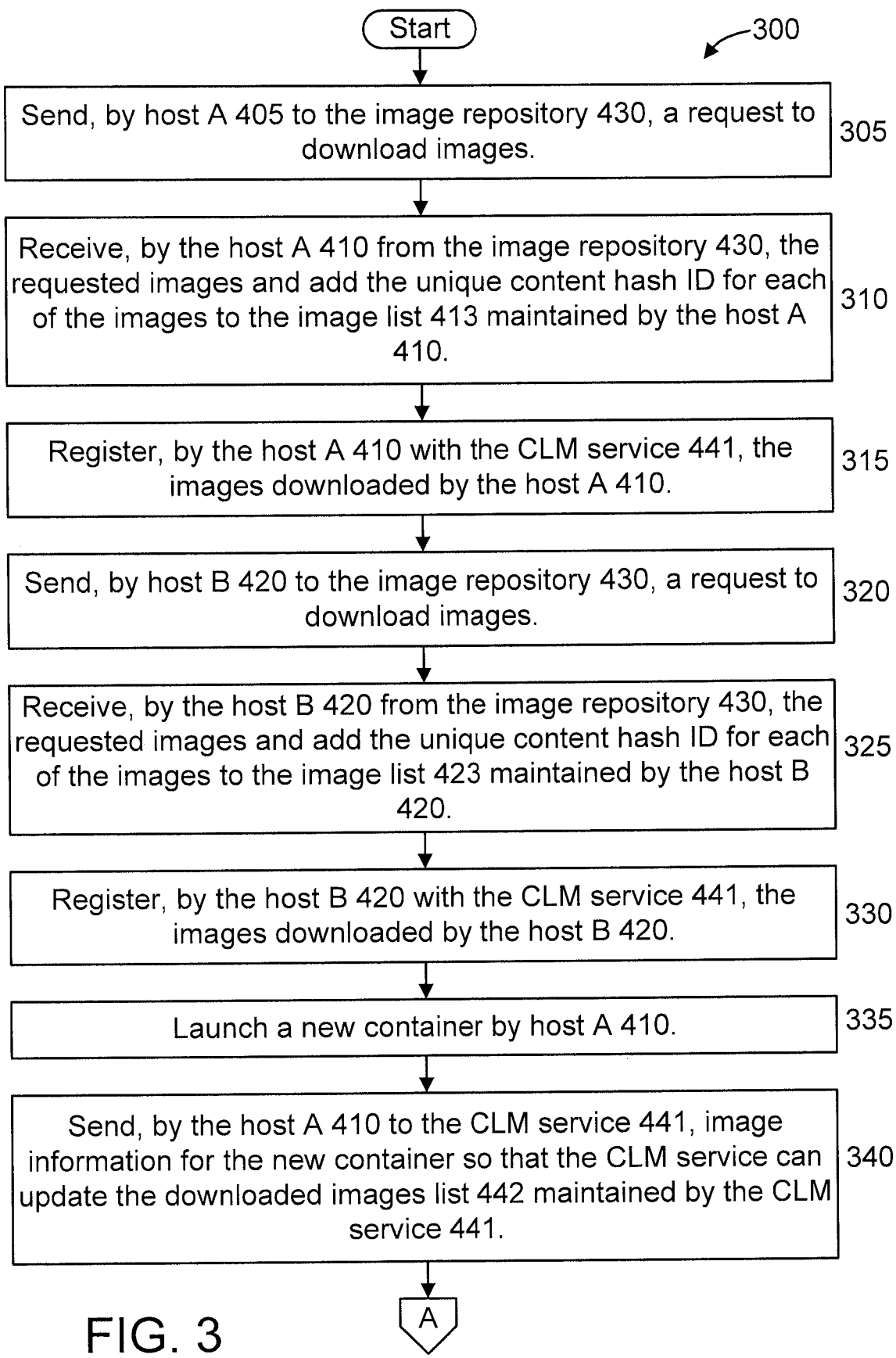
FIGS. 3-4 show an exemplary method for preparing a CLM registry service in a container management system, in accordance with an embodiment of the present invention.
Figure 4:
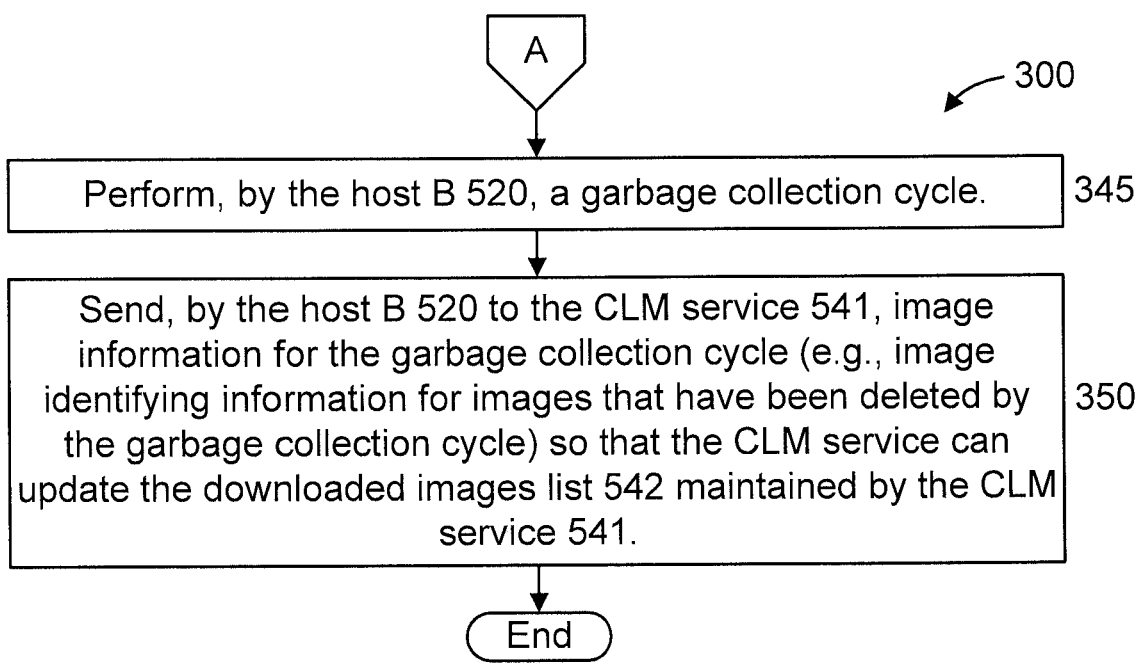
Figure 6:
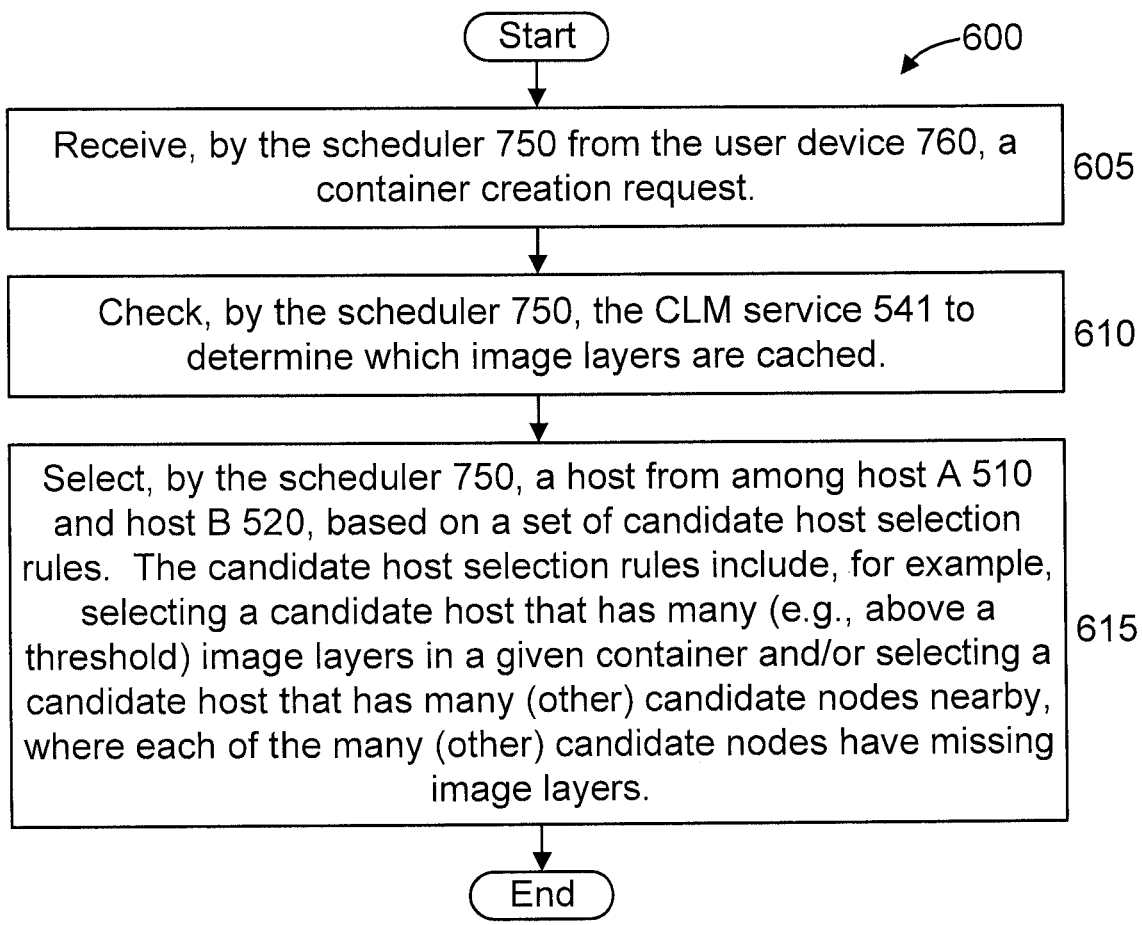
FIG. 6 shows an exemplary method for providing a container scheduling policy based on the CLM registry service, in accordance with an embodiment of the present invention.
Figure 8:
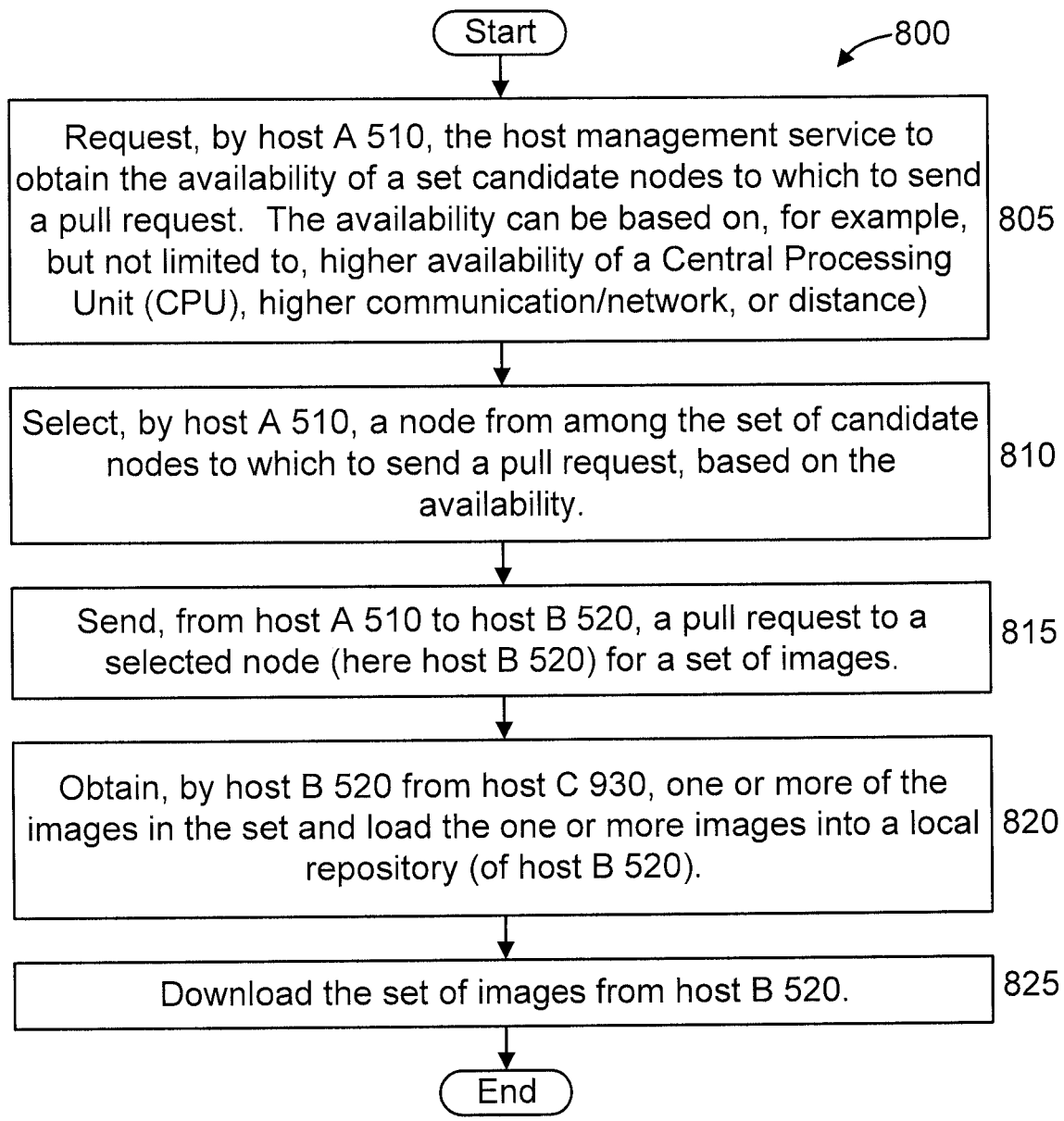
FIG. 8 shows an exemplary method for pulling cached image layers from nearby nodes to the scheduled node based on the scheduling policy, in accordance with an embodiment of the present invention.

Further, it is to be appreciated that processing system 100 may perform at least part of the methods described herein including, for example, at least part of method 200 of FIG. 2 and/or at least part of method 300 of FIGS. 3-4 and/or at least part of method 600 of FIG. 6 and/or at least part of method 800 of FIG. 8. Similarly, part or all of environments 500, 700, 900, and 1000 may be used to perform at least part of method 200 of FIG. 2 and/or at least part of method 300 of FIGS. 3-4 and/or at least part of method 600 of FIG. 6 and/or at least part of method 800 of FIG. 8.

FIG. 2 shows an exemplary method 200 for sharing container images between multiple hosts through container orchestration, in accordance with an embodiment of the present invention. Method 200 includes steps 205, 210, and 215. Step 205 is described in further detail with respect to FIGS. 3-5. Step 210 is described in further detail with respect to FIGS. 6 and 7. Step 215 is described in further detail with respect to FIGS. 8 and 9.

At step 205, prepare a CLM registry service in a container management system.

At step 210, provide a container scheduling policy based on the CLM registry service.

At step 215, pull cached image layers from nearby nodes to the scheduled node based on the scheduling policy.

Figure 5:
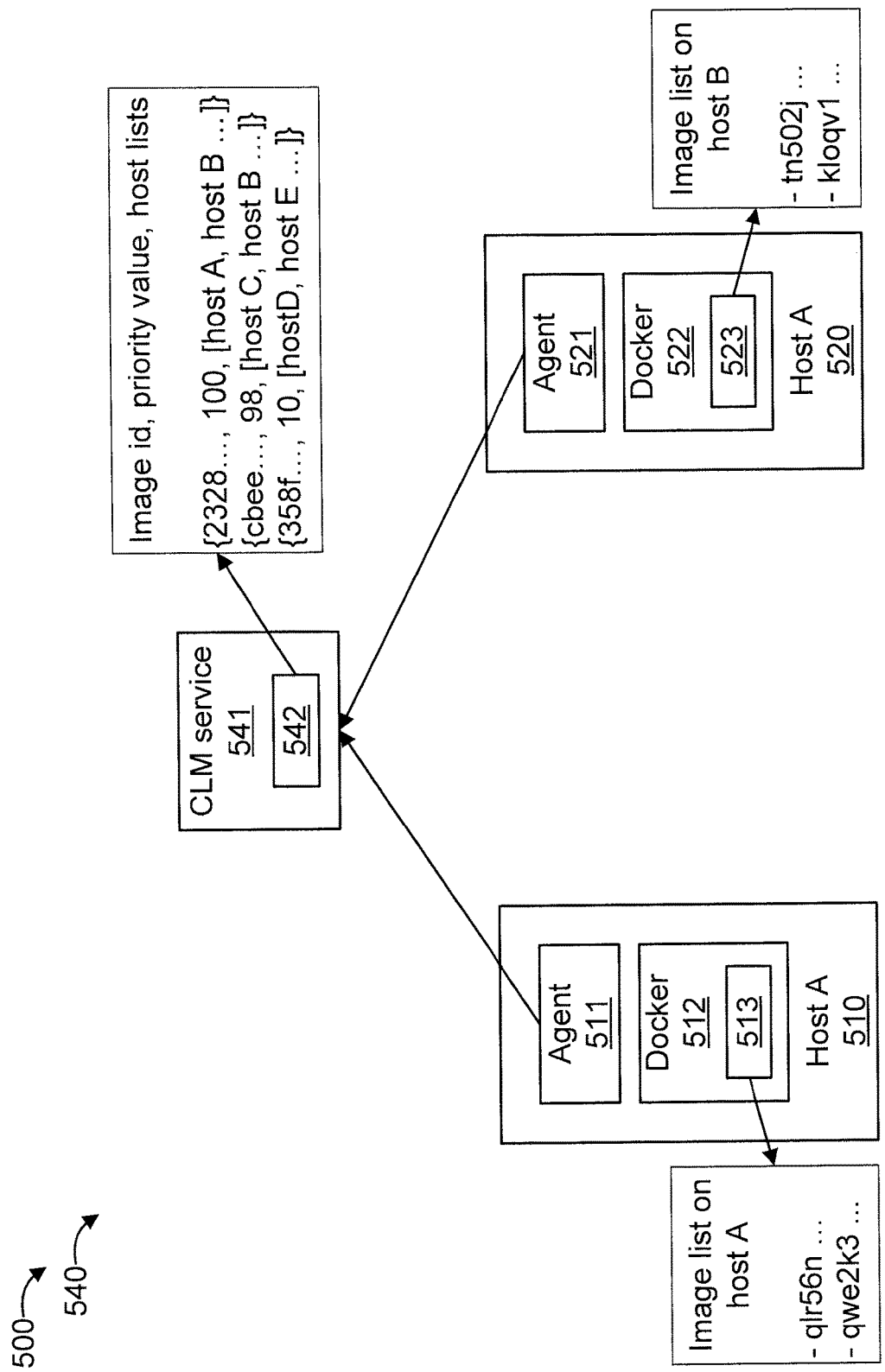
FIG. 5 shows an exemplary environment to which the method of FIGS. 3-4 can be applied, in accordance with an embodiment of the present invention.

FIGS. 3-4 show an exemplary method 300 for preparing a CLM registry service in a container management system, in accordance with an embodiment of the present invention. FIG. 5 shows an exemplary environment 500 to which the method 300 of FIGS. 3-4 can be applied, in accordance with an embodiment of the present invention.

The method 300 and environment 500 relate to step 205 of method 200 of FIG. 2.

Referring to FIG. 5, the environment 500 involves a host A 510, a host B 520, an image repository 530, and a container orchestration system 540.

The host A 510 includes an agent 511 and a Docker® component (e.g., a container) 512. The Docker® component 512 maintains an image list 513 of the images on host A 510. The image list 513 includes unique content hash IDs for each of the images on host A 510.

The host B 520 includes an agent 521 and a Docker® component (e.g., a container) 522. The Docker® component 522 maintains an image list 523 of the images on host B 520. The image list 523 includes unique content hash IDs for each of the images on host B 520.

The image repository 530 stores images that can be downloaded by the host A 510 and the host B 520.

The container orchestration system 540 manages the sharing of container images between the multiple hosts through container orchestration. The container orchestration system 540 includes a CLuster Membership (CLM) service 541.

The CLM SVC 541 maintains a list 542 (also referred to as "downloaded images list") of images downloaded by the host A 510 and the host B 520. The list 542 includes container attributes. The container attributes can include, but are not limited to, image layer id, images id owned by nodes, node distance, and so forth.

Referring to FIGS. 3 and 5, at step 305, send, by host A 505 to the image repository 530, a request to download images.

At step 310, receive, by the host A 510 from the image repository 530, the requested images and add the unique content hash ID for each of the images to the image list 513 maintained by the host A 510.

At step 315, register, by the host A 510 with the CLM service 541, the images downloaded by the host A 510. The images downloaded by the host A 510 are registered in the downloaded images list 542 maintained by the CLM service 541.

At step 320, send, by host B 520 to the image repository 530, a request to download images.

At step 325, receive, by the host B 520 from the image repository 530, the requested images and add the unique content hash ID for each of the images to the image list 523 maintained by the host B 520.

At step 330, register, by the host B 520 with the CLM service 541, the images downloaded by the host B 520. The images downloaded by the host B 520 are registered in the downloaded images list 542 maintained by the CLM service 541.

At step 335, launch a new container by host A 510.

At step 340, send, by the host A 510 to the CLM service 541, image information for the new container so that the CLM service can update the downloaded images list 542 maintained by the CLM service 541.

At step 345, perform, by the host B 520, a garbage collection cycle. The garbage collection cycle can be performed using, for example, but not limited to, Least Recently Used (LRU), etc.

At step 350, send, by the host B 520 to the CLM service 541, image information for the garbage collection cycle (e.g., image identifying information for images that have been deleted by the garbage collection cycle) so that the CLM service can update the downloaded images list 542 maintained by the CLM service 541.

Figure 7:
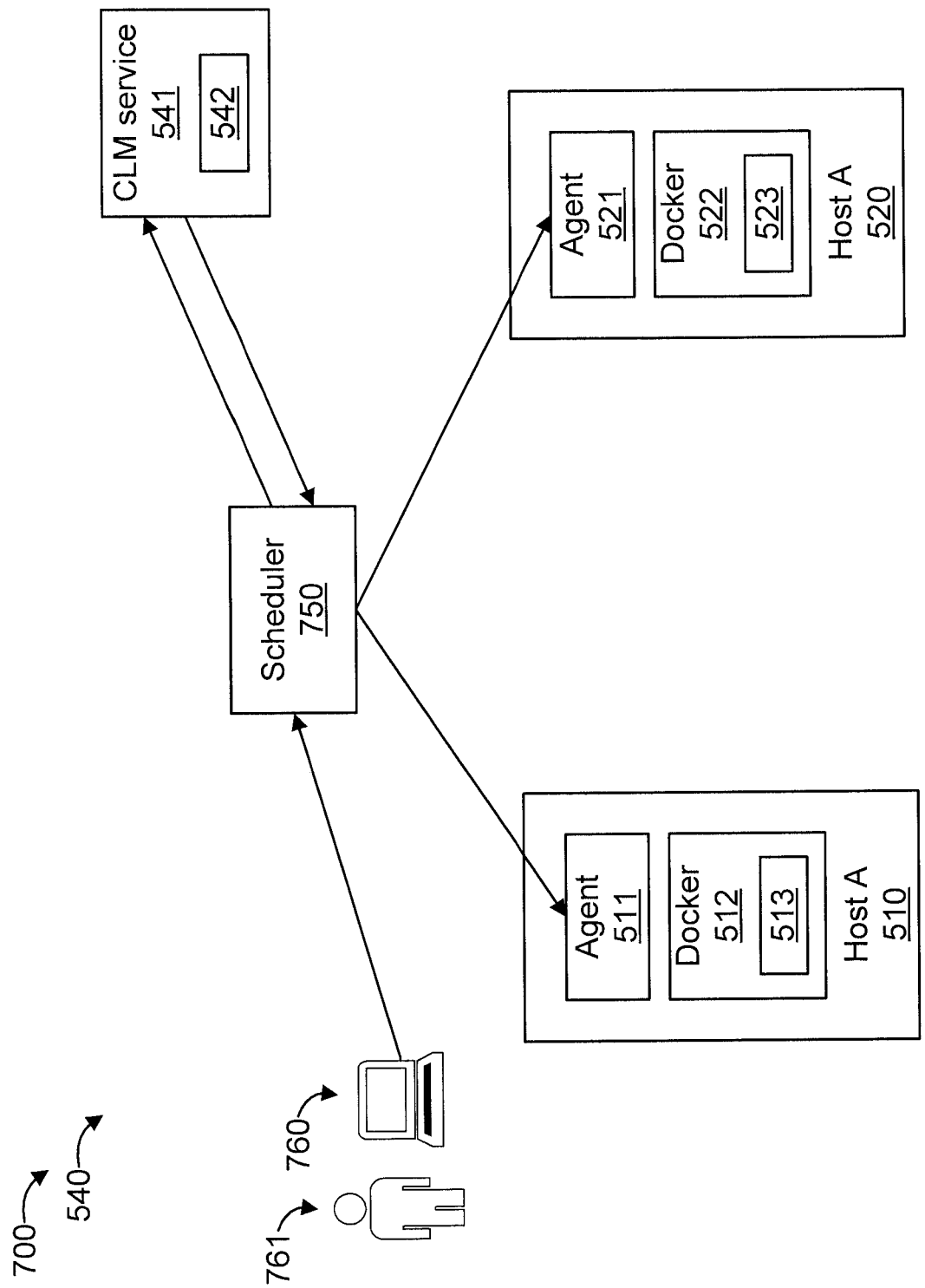
FIG. 7 shows an exemplary environment to which the method of FIG. 6 can be applied, in accordance with an embodiment of the present invention.

FIG. 6 shows an exemplary method 600 for providing a container scheduling policy based on the CLM registry service, in accordance with an embodiment of the present invention. FIG. 7 shows an exemplary environment 700 to which the method 600 of FIG. 6 can be applied, in accordance with an embodiment of the present invention.

The method 600 and environment 700 relate to step 210 of method 200 of FIG. 2.

Referring to FIG. 7, the environment 700 is similar to environment 500, with the inclusion of a container scheduler (interchangeably referred to as "scheduler" in short) 750 and a user device (e.g., a computer) 760. The user device 760 is operated by a user 761. That is, the environment of the invention (as initially shown in FIG. 5) is shown in further detail to include the preceding elements 750, 760, and 761 relative to step 210 of method 200 of FIG. 2. The scheduler 750 can be considered to be part of the container orchestration system 540 of FIG. 5.

Referring to FIGS. 6 and 7, at step 605, receive, by the scheduler 750 from the user device 760, a container creation request.

At step 610, check, by the scheduler 750, the CLM service 541 to determine which image layers are cached (at which nodes/hosts).

At step 615, select, by the scheduler 750, a host from among host A 510 and host B 520, based on a set of candidate host selection rules. The candidate host selection rules include, for example, selecting a candidate host that has many (e.g., above a threshold) image layers in a given container and/or selecting a candidate host that has many (other) candidate nodes nearby, where each of the many (other) candidate nodes have missing image layers.

Figure 9:
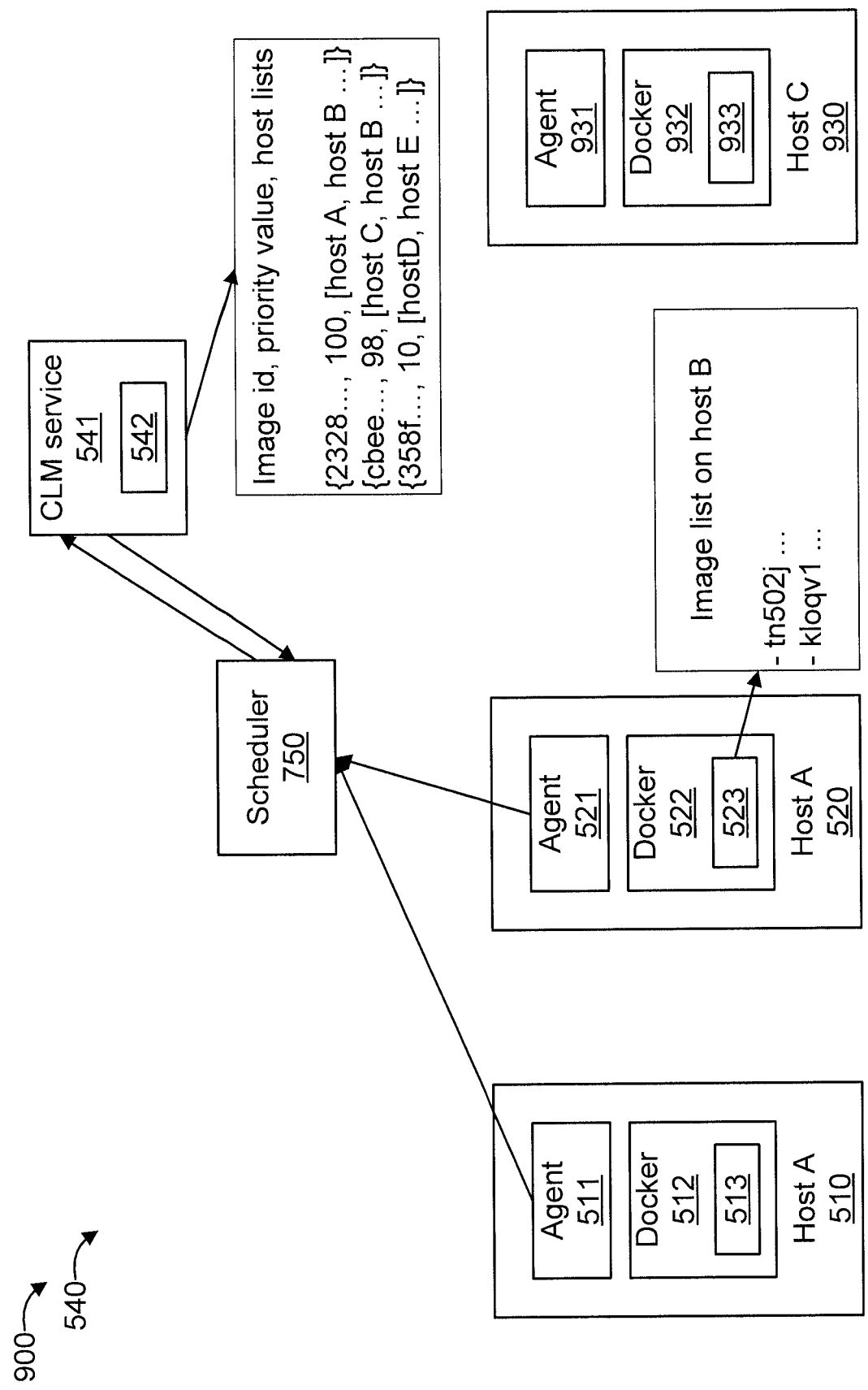
FIG. 9 shows an exemplary environment to which the method of FIG. 8 can be applied, in accordance with an embodiment of the present invention.

FIG. 8 shows an exemplary method 800 for pulling cached image layers from nearby nodes to the scheduled node based on the scheduling policy, in accordance with an embodiment of the present invention. FIG. 9 shows an exemplary environment 900 to which the method 800 of FIG. 8 can be applied, in accordance with an embodiment of the present invention.

The method 800 and environment 900 relate to step 215 of method 200 of FIG. 2.

Referring to FIG. 9, the environment 900 is similar to environment 700, with the inclusion of an additional host C 930. That is, the environment of the invention (as initially shown in FIG. 5 and further shown in FIG. 7) is shown in further detail to include the preceding element 930 relative to step 215 of method 200 of FIG. 2. Host C 930 includes an agent 931 and a Docker® component (e.g., a container) 932. The Docker® component maintains an image list 933 of the images on host C 930.

Referring to FIGS. 8 and 9, at step 805, request, by host A 510, the host management service to obtain the availability of a set candidate nodes to which to send a pull request.

The availability can be based on, for example, but not limited to, higher availability of a Central Processing Unit (CPU), higher communication/network, or distance).

At step 810, select, by host A 510, a node from among the set of candidate nodes to which to send a pull request, based on the availability.

At step 815, send, from host A 510 to host B 520, a pull request to a selected node (here host B 520) for a set of images.

At step 820, obtain, by host B 520 from host C 930, one or more of the images in the set and load the one or more images into a local repository (of host B 520). The one or more images are images specified in the pull request, but are not present at host B 520 instead being present at nearby host C 930. The remaining images in the set are already present at host B 520.

At step 825, download the set of images from host B 520. In this way, the set of images can be obtained from one or more nearby host instead of a centralized image repository.

Thus, the present invention provides a method and system for sharing container images between multiple hosts through container orchestration.

In cases when the provided external network is narrow or very limited, container launching latency is drastically improved when the present invention is used.

In an embodiment, we can use an internal cluster network for getting container images from other hosts and not from the Internet.

The present invention provides resiliency in that a host can launch containers even if the external network is not available.

In an embodiment, the present invention can be used to extend an image pull rule for pods in Kubernetes®. The rule can use designators including, but not limited to, the following set: [Always, Never, If Not Present, Neighbor].

In an embodiment, the present invention can be used to define a service for resolving a request involving a neighbor node/host.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
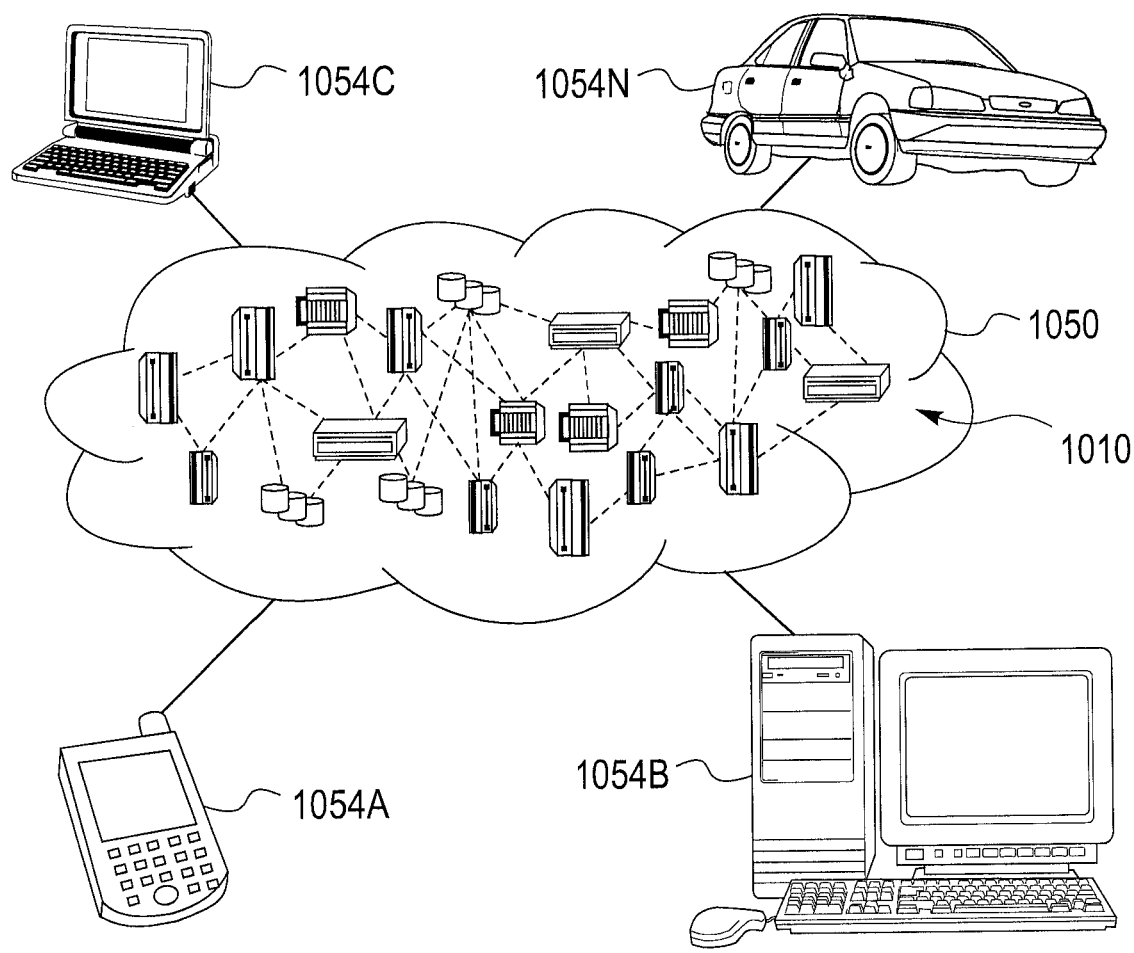
FIG. 10 shows a cloud computing environment, in accordance with an embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
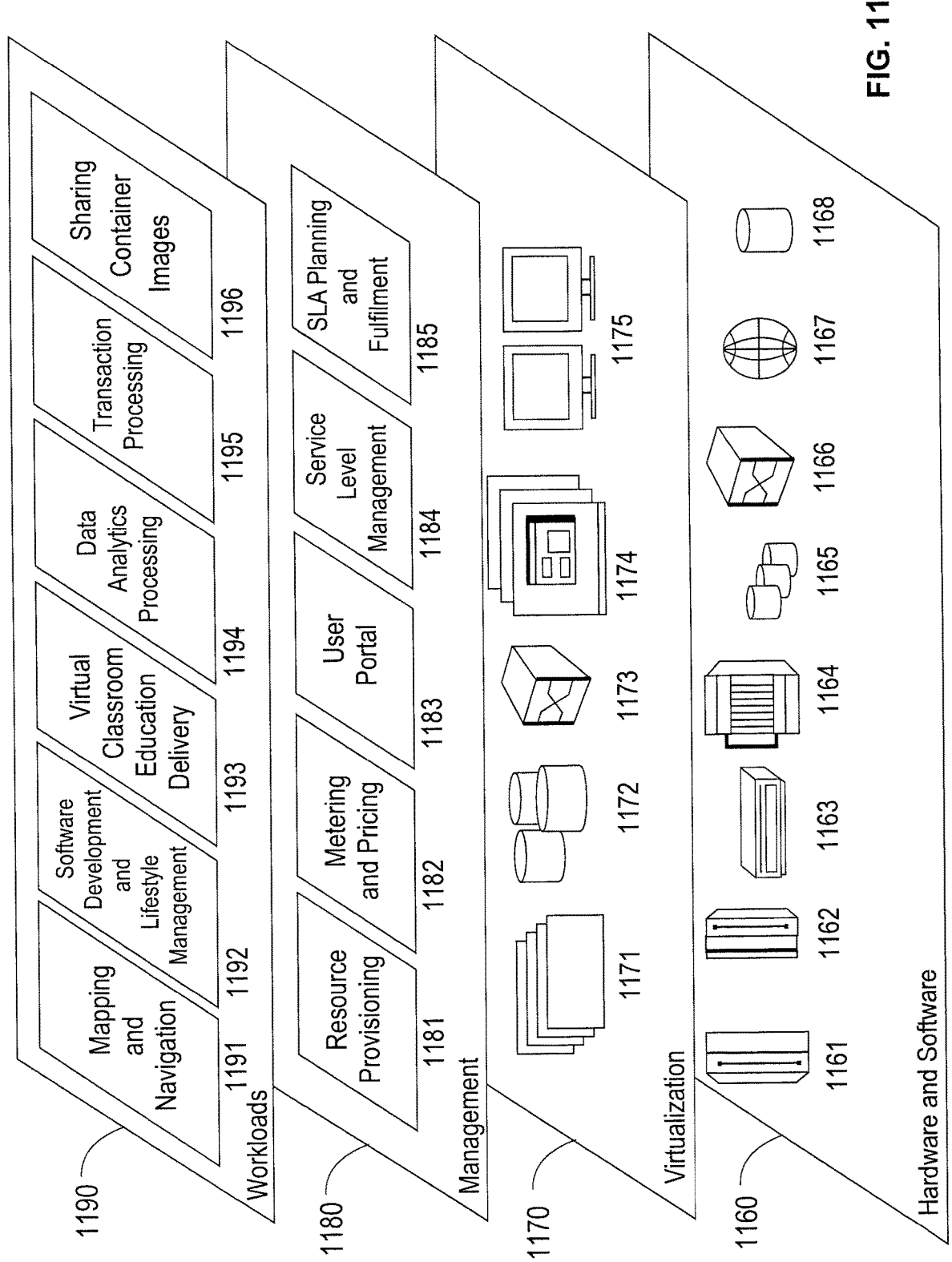
FIG. 11 shows abstraction model layers, in accordance with an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and sharing container images between multiple hosts through container orchestration 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer program product performing container sharing and scheduling in an environment having a plurality of content consuming nodes and a bypassable centralized container repository, the computer program product comprising a non-transitory computer readable storage medium having program instructions embodied therewith, the program instructions executable by a computer to cause the computer to perform a method comprising:
    deploying a container management service system that manages a list of layered images, the list of layered images specifying one or more container attributes for each of the layered images stored at the plurality of content consuming nodes;
    selecting, by a processor-based scheduler of the container management system based on the list of layered images, a given one of the plurality of content consuming nodes which (i) includes image layers residing in a container and (ii) communicates with one or more candidate nodes that include one or more missing image layers, wherein the one or more candidate nodes are determined from among the plurality of content consuming nodes based on one or more availability criterion; and
    bypassing, using a cluster membership registry service of the container management service system as an intermediary, wherein the cluster membership registry maintains a list of images downloaded from the plurality of content consumer nodes, the centralized container repository to satisfy a pull request by pulling the one or more missing image layers from the one or more candidate nodes and copying the one or more missing image layers to the given one of the plurality of content consuming nodes, wherein said pulling step comprises the one or more candidate nodes communicating with each other in order to satisfy the pull request.

2. The computer program product of claim 1, wherein the method further comprises updating the list of layered images before launching a new container by any of the plurality of content consuming nodes.

3. The computer program product of claim 1, wherein the method further comprises updating the list of layered images before performing an image garbage collection cycle on any of the plurality of content consuming nodes.

4. The computer program product of claim 1, wherein the one or more candidate nodes comprise two candidate nodes, the two candidate nodes comprising a first candidate node and a second candidate node, wherein a given image layer from among the one or more missing image layers is missing from the first candidate node but present at the second candidate node, and wherein said pulling step provides a copy of the given image layer from the second candidate node to both the given one of the plurality of content consuming nodes and the first candidate node by pulling the given image layer through the first candidate node to the given one of the plurality of content consuming nodes and storing the given image layer at the first candidate node and the given one of the plurality of content consuming nodes.

5. The computer program product of claim 1, wherein the one or more container attributes are selected from the group consisting of an image layer identifier, an image identifier, and a node distance.

6. The computer program product of claim 1, wherein the one or more availability criterion are selected from the group consisting of CPU availability, communication bandwidth availability, and storage availability.

7. The computer program product of claim 1, wherein the list of layered images comprises a respective unique identifier for each image layer of the layered images.

8. The computer program product of claim 1, further comprising launching a new container by the given one of the plurality of content consuming nodes by pulling the layered images for the new container from one or more other ones of the plurality of content consuming nodes.

9. The computer program product of claim 8, wherein pulling the layered images for the new container comprises bypassing a central repository that also includes copies of the layered images for the new container.

10. The computer program product of claim 1, wherein the method further comprises registering a downloaded image list of each of the plurality of content consuming nodes with the container management service system.

11. The computer program product of claim 1, wherein the environment is a cloud environment.

12. The computer program product of claim 1, wherein software for implementing the method is provided as a service in the cloud environment.

13. The computer program product of claim 1, wherein the list of images downloaded from the plurality of content consumer nodes further includes container attributes.

14. A system performing container sharing and scheduling in an environment having a plurality of content consuming nodes and a bypassable centralized container repository, the system comprising:

a hardware-processor-based container management service system having a hardware-based processor and memory device configured to:

manage a list of layered images, the list of layered images specifying one or more container attributes for each of the layered images stored at the plurality of content consuming nodes;

select, based on the list of layered images, a given one of the plurality of content consuming nodes which (i) includes image layers residing in a container and (ii) communicates with one or more candidate nodes that include one or more missing image layers, wherein the one or more candidate nodes are determined from among the plurality of content consuming nodes based on one or more availability criterion; and bypass, using a cluster membership registry service of the container management service system as an intermediary, wherein the cluster membership registry maintains a list of images downloaded from the plurality of content consumer nodes, the centralized container repository to satisfy a pull request by pulling the one or more missing image layers from the one or more candidate nodes and copying the one or more missing image layers to the given one of the plurality of content consuming nodes, wherein said pulling comprises the one or more candidate nodes communicating with each other in order to satisfy the pull request.

15. The system of claim 14, wherein the environment is a cloud environment.

* * * * *